United States Patent [19]
Gardner

[11] 3,794,744
[45] Feb. 26, 1974

[54] PURIFICATION OF HOP EXTRACTS
[75] Inventor: David Stanley John Gardner, Reigate, England
[73] Assignee: White Tomkins Limited,, Reigate, Surrey, England
[22] Filed: May 10, 1972
[21] Appl. No.: 252,342

[52] U.S. Cl. .................................................. 426/424
[51] Int. Cl. ................................ A23l, C12h /100
[58] Field of Search ........................... 99/50.5, 51, 52

[56] References Cited
OTHER PUBLICATIONS
Ashurst et al. "Chemistry of Hop Constituents XXV Xanthohumol Content" J. Institute of Brewing, Vol. 71, pp. 492–495, (1965).

Primary Examiner—Lionel M. Shapiro
Assistant Examiner—R. B. Penland

[57] ABSTRACT

Xanthohumol is removed from a hop extract solution by treatment with a polyamide, for example by passing the solution down a chromatographic column of polyamide or by slurrying together and separating the insoluble polyamide. Polyvinyl pyrrolidone is preferred. The treated extract can be used in brewing with or without further treatment.

7 Claims, No Drawings

PURIFICATION OF HOP EXTRACTS

BACKGROUND OF THE INVENTION

This invention relates to the purification of hop extracts and particularly to the removal of xanthohumol and analogous materials from hop extracts.

The main component of the hard resin fraction of hop resins is the chalkone xanthohumol. This material has been shown by Ashurst, Laws and Stevens (J. Inst. Brew. U.S. Pat. No. 71,492 (1965)) to be present in amount of almost 1 percent of the dry weight of fresh or unkilned, freeze-dried hops and to be present in an amount of about 0.3 percent in oast dried sulphured hops. Other analogous chalkones may also be present and the term xanthohumol as used herein includes such analogous materials. Most solvents which are used to prepare hop extracts will extract some xanthohumol, the amount extracted depending on the polarity of the solvent used. When hops, or solvent extracts of hops, containing xanthohumol are employed in the traditional brewing process (which involves addition of the hops, or extracts, to the wort prior to boiling) the water insoluble portion of the hard resins, including the xanthohumol is rejected and removed. However, some unwanted co-precipitation of the desirable humulones with the xanthohumol occurs. Furthermore, in recent years it has been found advantageous to add hop extracts to the beer after completion of fermentation, the extracts having been first isomerised to convert the humulones present to the desirable bitter compounds the isohumulones. Such processes are described, for example, in U.K. Patent Specification No. 1,259,140. Unless steps have been taken to remove xanthohumol, some of this material, together with the isomerised product, the flavanone isoxanthohumol, is carried through to the final product and, particularly when added to beer, tends to cause unwanted turbidity. This is particularly so since xanthohumol is slightly soluble in water in the form of its alkali metal salts, but is virtually insoluble in the form of free acid.

SUMMARY OF THE INVENTION

It is an object of this invention to overcome this problem by means of a method of removing xanthohumol from a hop extract comprising contacting the hop extract in the form of a solution in a suitable solvent with a polyamide.

DESCRIPTION OF PREFERRED EMBODIMENTS

The preferred polyamide is polyvinylpyrrolidone. A convenient solvent is methanol, but other appropriate solvents, such as other alcohols, esters, ketones or hydrocarbons may be used.

The hop extract may contain both hard and soft resins in which case, if the solvent used is methanol, the xanthohumol freed methanolic solution after its removal from the polymide, can be extracted with petroleum spirit to extract the soft resin fraction of the hop extract without the need for an intermediate isolation step.

Such removal of xanthohumol before the petroleum spirit extraction is useful as, if xanthohumol is still present, the extraction tends to be incomplete and the continued presence of some xanthohumol can lead to the entraining of some of the desirable humulones in the interfacial material.

However, the method for removing xanthohumol can also be applied to hop extracts from which other hard resins have been at leats partially removed or the method can even be applied to a xanthohumol-containing hard resin fraction itself to remove the xanthohumol selectively.

The polyamide material may be used in the form of a chromatographic column through which the hop extract solution is passed and the xanthohumol can later be eluted, using for example water-saturated ethyl acetate. Alternatively, the polyamide material may simply be slurried with the solution. The absorbed xanthohumols may be recovered from the polyamide by solvent extraction. Alternatively they may be chemically converted to compounds having no polyamide affinity, thus releasing them into a suitable solvent.

After contacting with the polyamide, the solution can be evaporated to yield an extract which can be further treated as desired, used directly in the traditional brewing process or dissolved in a water immiscible solvent for conversion to an isomerised extract as described in U.K. Patent Specification No. 1,259,140.

The following specific examples illustrate the invention:

EXAMPLE 1

135 grms. of a hop extract estimated to contain 43 percent alpha-acids by conductometric titration, prepared by extracting hops with toluene and ridding the crude product of fixed oils, waxes and fat by treatment with 90 percent methanol, were re-dissolved in methanol (100 percent) and the volume was made up to 300 mls. This solution was passed down a chromatographic column prepared with 25 grms. Polyvinylpyrrolidone (Polyclar A.T.) + 25 grms. Hyflo Supercel, wet packed with methanol, to give a column 4 inches long and 2 inches diameter. Polyclar A.T. is available from General Aniline and Film Corp. and Hyflo Supercel is one of a range of suitable filter aids available from the Zeolite division of John's Manville.

The column was developed with methanol until 600 mls. of eluate had been collected. At this point virtually all the coloured material had passed through the column except for a small pink coloured band at the top of the column together with the xanthohumol which was present a few cms. below this as a compact yellow band.

Evaporation of the primary eluate gave 131.5 grms. of purified resins estimated to contain 44 percent alpha-acids.

Elution of the column with ethyl acetate (water saturated) until all the colour had been removed followed by evaporation of the solvent yielded 3.5 grms. crystalline xanthohumol (M.pt. = 172° C). The purified resins, the starting material and the xanthohumol fractions were all examined by thin layer chromatography for the presence of xanthohumol and other hop constituents by the procedure described below. No xanthohumol was detected in the purified resin.

THIN LAYER CHROMATOGRAPHY PROCEDURE

Plater with a 0.25 mm. layer of silica gel (Merck Kieselgel G.) were activated by heating at 110° C for 30 minutes and then contracted with the solution to be examined. The developing solvent used was ethyl acetate: benzene 1:1. The spray reagent used was 2 percent ferric chloride in pure methanol or 10 percent formalin in methanol containing 1 percent sulphuric acid. On heating the plates, xanthohumol if present, appeared as a spot, well separated from the alpha-and beta-acids (if present), appearing approximately mid way between them. The spot was yellow ochre in colour with ferric chloride reagent and cherry red with the formalin.

EXAMPLE 2

3,000 grms. of a de-solventised extract of OR55 Hops prepared with toluene and estimated to contain 36.2 percent alpha-acids were warmed and poured into 2 gallons of 100 percent methanol, decanted from the methanol insoluble waxes and fats (512 grms. insolubles) which were then washed by resuspending in fresh methanol and allowing to settle once again. The bulked primary methanol extract and washings were stirred for 30 minutes with 500 grms. of polyvinylpyrrolidone in the insoluble form (Polyclar A.T.). The methanol solution was decanted from the Polyclar, which was washed with clean methanol, the washings being added to the bulk. The methanol was distilled off, finally under vacuum, to give a resin free of xanthohumol.

Yield = 2,161 grms. Estimated 48.2 percent alpha-acids by titration.

∴ Recovery of alpha-acids = 95.8 percent.

EXAMPLE 3

387 grms. hard resin fraction derived from a hop extract containing 12.5 percent of xanthohumol (determined from the ion-exchange chromatogram by calculating the area under the curve) were dissolved in pure methanol and the solution was chromatographed on a column of polyvinyl-pyrrolidone. (250 grms. Polyclar A.T. + 250 grms. Hyflo Supercel in 4 inch diameter by 24 inch column.)

The column was developed with methanol until the frontal band material had been eluted, leaving the yellow xanthohumol zone. The eluting solvent was then changed to water equilibrated ethyl acetate and the column was washed with this until all yellow colour had been eluted.

Evaporation of the methanol yielded 317 grms. of xanthohumol free resin and evaporation of the ethyl acetate under a partial vacuum yielded 51 grms. of xanthohumol which immediately crystallised upon removal of the last traces of solvent. This yield of relatively pure xanthohumol is in agreement with that determined by ion-exchange chromatography.

EXAMPLE 4

3kg. of a hop extract obtained by contacting Hallertau Northern Brewer hops with methylene chloride and recovering the solvent, and estimated to contain 43.2 percent by weight of alpha-acids, was warmed to a fluid consistency, poured into 15 litres of pure methanol and stirred vigorously for 10 minutes. After settling, the clear solution (a) was decanted from the insoluble waxes and fats which were re-extracted with 2 × 10 litres pure methanol (b and c). The insoluble waxes and fats amounted to 217 g.

The primary methanol extract (a) was applied to the top of a column (6 inches diameter × 12 inches long) containing a mixture of 750 g. Polyclar AT + 750 g. Hyflo Supercel. The column was developed with the methanol extracts (b) and (c) and finally washed with fresh methanol. The xanthohumol was clearly visible as an intense yellow band occupying about three-fourths of the column length. The xanthohumol was completely removed by elution with ethyl acetate saturated with water and the column washed, ready for re-use, with pure methanol. Evaporation of the ethyl acetate eluate yielded crystalline xanthohumol (124 grms.).

The methanol eluate was adjusted with water to 70 percent methanol by volume and extracted with light petroleum (10 litres) followed by two further extractions (5 litres each) which were all bulked. Evaporation of the petrol extracted aqueous methanol solution gave a xanthohumol free hard resin (203 grms). The bulked petrol extracts yielded on evaporation the desired soft resin fraction (2,456 grms.) containing 50.0 percent by weight of alpha-acids.

I claim:

1. In a method of removing xanthohumol from a hop extract dissolved in a suitable solvent, the improvement consisting of the steps of contacting the solution of the hop extract with polyvinylpyrrolidone and separating the solution from the polyvinyl pyrrolidone whereby the xantholhumol is separated from the solution by remaining with the polyvinyl pyrrolidone.

2. The improvement as claimed in claim 1 wherein the solvent is methanol.

3. A method of removing xanthohumol from a hop extract which comprises the steps of making a solution of a hop extract in a suitable solvent, contacting the solution with a polyvinyl pyrrolidone in insoluble form to sequester the xanthohumol and separating the solution from the polyvinyl pyrrolidone.

4. A method of separating soft resins and hard resins in a hop extract containing soft and hard resins which comprises the steps of making a solution of the hop extract in methanol, contacting the solution with a polyvinyl pyrrolidone in insoluble form to remove xanthohumol from the solution, separating the solution from the polyvinyl pyrrolidone, and extracting the solution with petroleum spirit to separate the soft resins from the remaining hard resins.

5. A method according to claim 1 wherein the hop extract solution is contacted with the polyvinyl pyrrolidone by passing the solution through a chromatographic column of the polyvinyl pyrrolidone in insoluble form.

6. A method according to claim 5 including the further steps of subsequently eluting the removed xanthohumol from the chromatographic column with water-saturated ethyl acetate.

7. A method according to claim 1 wherein the hop extract solution is contacted with the polyvinyl pyrrolidone by slurrying the solution with the polyvinyl pyrrolidone in insoluble form.

* * * * *